United States Patent
Binford et al.

(10) Patent No.: US 9,830,233 B2
(45) Date of Patent: Nov. 28, 2017

(54) ONLINE BACKUP TO AN OBJECT SERVICE USING BULK EXPORT

(71) Applicant: NetApp, Inc., Sunnyvale, CA (US)

(72) Inventors: Charles Binford, Wichita, KS (US); Theresa Segura, Boulder, CO (US); William Hetrick, Wichita, KS (US)

(73) Assignee: NetApp, Inc., Sunnyvale, CA (US)

(*) Notice: Subject to any disclaimer, the term of this patent is extended or adjusted under 35 U.S.C. 154(b) by 182 days.

(21) Appl. No.: 15/010,101

(22) Filed: Jan. 29, 2016

(65) Prior Publication Data

US 2017/0220423 A1   Aug. 3, 2017

(51) Int. Cl.
| | |
|---|---|
| G06F 21/00 | (2013.01) |
| G06F 11/14 | (2006.01) |
| H04L 29/08 | (2006.01) |
| G06F 17/30 | (2006.01) |
| H04L 9/12 | (2006.01) |
| G06F 3/06 | (2006.01) |

(52) U.S. Cl.
CPC ......... *G06F 11/1464* (2013.01); *G06F 3/067* (2013.01); *G06F 3/0619* (2013.01); *G06F 3/0665* (2013.01); *G06F 17/30575* (2013.01); *H04L 9/12* (2013.01); *H04L 67/1097* (2013.01); *G06F 2201/84* (2013.01)

(58) Field of Classification Search
CPC .................................................. G06F 11/1464
See application file for complete search history.

(56) References Cited

U.S. PATENT DOCUMENTS

| | | | | |
|---|---|---|---|---|
| 8,386,733 | B1* | 2/2013 | Tsaur | G06F 11/1458 |
| | | | | 711/162 |
| 9,619,322 | B2* | 4/2017 | Cowling | G06F 11/1048 |
| 2007/0100789 | A1* | 5/2007 | Malhotra | G06Q 30/02 |
| 2008/0313291 | A1* | 12/2008 | Kazmi | G06F 17/2247 |
| | | | | 709/206 |
| 2012/0016841 | A1* | 1/2012 | Karonde | G06F 11/1448 |
| | | | | 707/641 |

(Continued)

OTHER PUBLICATIONS

AWS Import/Export Developer Guide, Amazon web services, downloaded Jan. 5, 2016, 2 pages.

(Continued)

*Primary Examiner* — Ali Shayanfar
(74) *Attorney, Agent, or Firm* — Haynes and Boone, LLP

(57) ABSTRACT

A system and method for improving storage system performance by maintaining data integrity during bulk export to a cloud system is provided. A backup host reads a selected volume from the storage system via an I/O channel. The storage system remains online during bulk export and tracks I/O to the selected volume in a tracking log. The backup host compresses, encrypts, and calculates a checksum for each data block of the volume before writing a corresponding data object to export devices and sending a checksum data object to the cloud system. The devices are shipped to the cloud system, which imports the data objects and calculates a checksum for each. The storage system compares the imported checksums with the checksums in the checksum data object, and adds data blocks to the tracking log when errors are detected. An incremental backup is performed based on the contents of the tracking log.

17 Claims, 6 Drawing Sheets

(56) References Cited

U.S. PATENT DOCUMENTS

| | | | |
|---|---|---|---|
| 2014/0237464 A1* | 8/2014 | Waterman | G06F 8/65 717/172 |
| 2015/0112939 A1* | 4/2015 | Cantwell | G06F 11/1451 707/646 |
| 2015/0312243 A1* | 10/2015 | Ponsford | G06F 21/6218 713/159 |
| 2016/0021186 A1* | 1/2016 | de Sene | H04L 67/1097 709/213 |
| 2016/0127539 A1* | 5/2016 | Sharma | H04M 3/36 379/112.09 |
| 2017/0011087 A1* | 1/2017 | Hyde | G06F 17/30563 |
| 2017/0134493 A1* | 5/2017 | Chang | H04L 67/1097 |
| 2017/0161270 A1* | 6/2017 | Mason, Jr. | G06F 17/3023 |

OTHER PUBLICATIONS

Hetrick, William, et al., U.S. Appl. No. 14/521,053, entitled: Data Backup Technique for Backing Up Data to an Object Storage Service, filed Oct. 22, 2014, 28 pages.

Hetrick, William, et al., U.S. Appl. No. 14/523,550, entitled: Data Recovery Technique for Recovering Data From an Object Storage Service, filed Oct. 24, 2014, 22 pages.

* cited by examiner

| Initial Time | Incremental Time 1 | | Incremental Time N |
|---|---|---|---|
| V0, DS0<br>V0, DS1<br>V0, DS5<br>V0, DSM | V0, DS5<br>V0, DS14<br>V0, DS15<br>V0, DS16<br>V0, DS20 | ... | V0, DSX<br>V0, DSY |

First Incremental 205
Second Incremental 207
202
204  206  208

FIG.2

ONLINE BACKUP TO AN OBJECT SERVICE USING BULK EXPORT

TECHNICAL FIELD

The present description relates to data storage systems, and more specifically, to techniques to maintain data integrity during bulk export to a cloud storage system.

BACKGROUND

Cloud services have become an available and affordable data storage service. A typical service offered by a cloud storage provider is an object storage service. Object storage services generally charge a small transaction fee to write and read data as well as a fee for the amount of data stored. Object storage services typically utilize multiple replicas to guard against data loss to increase reliability. Object storage services are often accessed through Internet Protocol methods. Objects are written to the object store similar to a file system in that when an object is written to the object storage service, the object is an accessible entity. The whole object is written as part of a single command, and retrieved as a single command.

For backup operations of larger volumes, the initial backup operation of an entire storage system may prove to be a bottleneck. This may be due to the sheer size of the volume and available connection bandwidth, and in some situations may take weeks or months to complete using online bandwidth. To address this concern, some cloud services offer a bulk storage device backup option that allows the storage system to transfer the volume to the bulk storage device(s) and then ship those devices to the cloud services' physical location, where the volume is transferred from the bulk storage device(s) to the cloud service, which may take fewer time than transferring the volume online.

Problems can arise, however, while the bulk storage device(s) is in transit to the cloud service. For example, if the storage system is kept offline during this time, there is significant interruption to the storage system's operations. If the storage system is kept online, however, problems arise with how to maintain data consistency between what is backed up to the cloud service and any changes that may occur to data in the impacted volume(s) due to input/output (I/O) operations that come from one or more hosts during this time frame. Further, the storage system has an interest in confirming that data integrity has been maintained for the volume during the bulk transfer (e.g., no data from the volume is permanently lost from the cloud backup due to failure of a physical device, etc. during the transfer).

BRIEF DESCRIPTION OF THE DRAWINGS

The present disclosure is best understood from the following detailed description when read with the accompanying figures.

FIG. 2 illustrates the status of data extents for a volume, at different times with respect to what is to be backed up to an object storage system according to aspects of the present disclosure.

DETAILED DESCRIPTION

Figure 1:
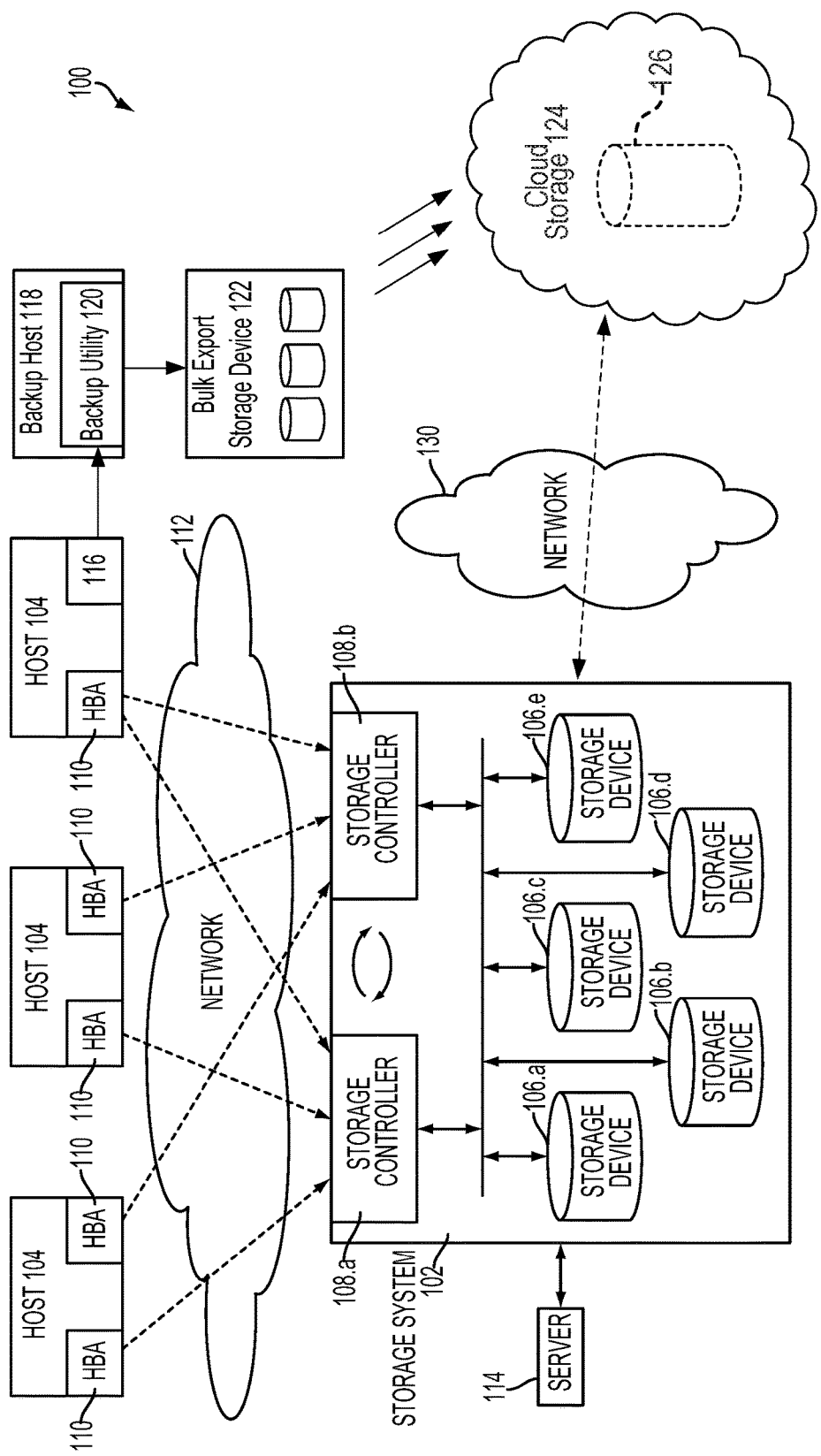
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for maintaining data integrity during bulk export to a cloud storage system. In an embodiment, a backup host requests a storage system to identify candidate volumes to bulk export for vaulting in a cloud storage system. The backup host may select a candidate volume from those identified. Once the backup host is connected to one or more bulk export storage devices, the backup host may begin reading the selected volume from the storage system (e.g., as sequential blocks of data from the volume) via an I/O channel of the storage system (e.g., a standard read/write path with no regard to the bulk export in progress).

Prior to the backup host initiating the bulk export with the first read request, the storage system may start a tracking log so that the storage system may remain online to service I/O requests from other hosts while the bulk export occurs. Thus, if any writes come to the storage system for the selected volume during the bulk export, it may be noted in the tracking log so that a subsequent incremental backup may be performed to maintain consistency with the volume vaulted to the cloud.

As the backup host reads the blocks of data from the selected volume, the backup host compresses the block, encrypts the block (e.g. where requested), and computes a checksum for the given block before writing it to a bulk export storage device. This is done for each block read until the selected volume has been written to the bulk export storage device(s) as data objects corresponding to the data blocks of the volume. The bulk export storage device(s) are then shipped to the cloud storage system (e.g., to a physical facility that houses at least a portion of the physical hardware used to provide the cloud storage). The backup host also sends a summary of the checksums (e.g., the checksums themselves) it computed to the cloud storage system for storage in their own data object. Upon receipt of the devices, the cloud storage system begins a bulk import process to transfer the data objects of the selected volume to a volume bucket in the cloud.

As each data object is read from the bulk export storage device(s), the cloud storage system generates and inputs information into an import log, including a checksum of the data read for the data objects—a checksum for each data object. Once the import process is done, the backup host notifies the storage system of the completion. The storage system requests the checksum data object from the cloud storage system, as well as the import log that includes the checksums calculated by the cloud storage system. The storage system compares the checksums against each other. If there are any mismatches or errors during the import of some of the data objects, then the storage system adds the corresponding data blocks of the volume to the tracking log it has maintained (even if no write came from a host for that data block during the time frame).

Once this comparison and updating (where applicable) of the tracking log is complete, the storage system initiates an incremental backup of the selected volume to the cloud storage system. For that incremental backup, only those data blocks that have changed (e.g., via a tracked write or because of an inconsistency between checksums from the bulk export/import) will be backed up via a network. Thus, the storage system may remain online to service I/O requests while the bulk export occurs. Further, less processing burden is imposed on the storage system because the backup host handles the compression, encryption, and checksum operations for volume data being exported. As a result, the storage system is able to better service incoming I/O during the export process (e.g., with less lag in response than were the storage system to handle compression, encryption, etc.). Further, embodiments of the present disclosure provide the ability to handle errors in the bulk export process so that any errors may be detected (e.g., by the checksum comparison) so that such errors do not precipitate starting the whole bulk export process again.

FIG. 1 illustrates a data storage architecture 100 in which various embodiments of the present disclosure may be implemented. The storage architecture 100 includes a storage system 102 in communication with a number of hosts 104 and backup host(s) 118, as well as a bulk export storage device 122 and a cloud storage system 124 that can provide remote backup services to the storage system 102. A backup host 118 may be a host 104 or alternatively may be a separate host coupled to one or more hosts 104 as illustrated in FIG. 1. As further illustrated in FIG. 1, the storage system 102 may further be in communication with a cloud storage system 124 (which may also be referred to herein as a cloud service or a cloud storage service, to name some examples).

The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

The cloud storage system 124 is a type of data storage that is provided on the cloud, e.g., an enterprise-class cloud storage array provided by a cloud storage provider with multiple copies of data distributed throughout the world, providing distributed resources that are fault tolerant and durable. In an embodiment, the cloud storage system 124 provisions resources on demand without regard for the underlying hardware wherever distributed throughout the world. Storage capacity with the cloud storage system 124 may be purchased or leased and may be provided by off-premises (e.g., physically remote) or on-premises services. The cloud storage system 124 may provide a hosted object storage service to subscribers, for example storage system 102 in FIG. 1.

While the storage system 102 and each of the hosts 104 (and/or backup host 118) are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 (and the backup host 118 or host 104) in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 (illustrated as storage devices 106.a-106.e in FIG. 1) and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.*a*, 108.*b* may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In a DDP, volume data, protection information, and spare capacity are distributed across all of the storage devices included in the pool. As a result, all of the storage devices in the DDP remain active, and spare capacity on any given storage device is available to all volumes existing in the DDP. Each storage device in the DDP is logically divided up into one or more data extents at various block addresses of the storage device. A data extent is assigned to a particular data stripe of a volume.

An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes. Further, according to embodiments of the present disclosure, one or more data stripes may compose a given segment as used herein (i.e., a segment may include some integer number of data stripes).

In the present example, storage controllers 108.*a* and 108.*b* are arranged as an HA pair. Thus, when storage controller 108.*a* performs a write operation for a host 104, storage controller 108.*a* may also sends a mirroring I/O operation to storage controller 108.*b*. Similarly, when storage controller 108.*b* performs a write operation, it may also send a mirroring I/O request to storage controller 108.*a*. Each of the storage controllers 108.*a* and 108.*b* has at least one processor executing logic to perform aspects of embodiments of the present disclosure.

Moreover, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size. In an embodiment, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), to name just a few examples. These configuration actions described with respect to server 114 may, alternatively, be carried out by any one or more of the other devices identified as hosts 104 in FIG. 1 without departing from the scope of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.*a*, 108.*b* of the storage system 102. The HBA 110 provides an interface for communicating with the storage controller 108.*a*, 108.*b*, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.*a*, 108.*b*). It is understood that the scope of present disclosure is not limited to either block-level or file-level protocols or object-based protocols, and in many embodiments, the storage system 102 is responsive to a number of different memory transaction protocols.

As noted previously, FIG. 1 also illustrates a backup host 118. The backup host 118 is shown in communication with I/O agent 116 of host 104. The I/O agent 116 may also be an HBA 110 as discussed above. The backup host 118 further includes a backup utility 120 that is used according to embodiments of the present disclosure. The backup host 118 may, in some embodiments, be separate from any host 104 as illustrated in FIG. 1; in alternative embodiments, the backup host 118 may be a host 104, such that one or more of the illustrated hosts 104 may include a backup utility 120 according to embodiments of the present disclosure. Generally, the backup utility 120 may be architected so that it may run on any available host 104, such as with a small I/O agent process being used to run on the host 104 to facilitate it. The backup utility 120 may operate to facilitate the transfer of one or more volumes from the storage system 102 to one or more bulk export storage devices 122.

For example, the backup utility 120 may query the storage system 102 to identify which storage volumes are candidates for backup to the cloud storage system 124. The backup utility 120 may further select the volume candidate for backup, generate a configuration file for the volume, determine the number of bulk export storage devices 122 to use for the bulk export, facilitate the transfer of the volume from the storage system 102 to the bulk export storage device(s) 122, and as part of that transfer perform compress and/or encrypt the data as it is stored on the bulk storage device(s) 122. The backup utility 120 may also compute a checksum, for example according to the MD5 hash function, for each data object from the volume and store those checksums in their own object on the cloud storage system 124. All this may be performed while the storage system 102 remains online, e.g. continues receiving I/O from one or more hosts 104, with a resulting self-consistent image backed up to the cloud storage system 124.

The bulk storage device 122 represents one or more storage devices (depending upon the size of the volume being exported) that receive and temporarily store the export of the volume(s) as data objects. The bulk storage device 122 may be an HDD, SSD, optical drive, and/or any other suitable volatile or non-volatile data storage medium. In some embodiments, the bulk storage device 122 may include multiple devices. These may be relatively homogeneous or alternatively heterogeneous. After one or more volumes are exported from the storage system 102 to the bulk storage device 122 via the backup utility 120 on the backup host 118, the bulk storage device 122 may be shipped to a physical location of the cloud storage system 124 (e.g., a server farm partially on which the cloud storage system 124 operates). There, the volume data temporarily stored on the bulk export storage device 122 may be transferred to one or more media hosting a cloud volume bucket (e.g., a container used to store one or more objects for the service user).

According to embodiments of the present disclosure, the form in which the data being exported from the one or more volumes is maintained in the volumes at the storage system 102 may differ from the form it is stored in the volume bucket 126 at the cloud storage system 124. Although FIG. 1 illustrates a single volume bucket 126, one or more may be used for a given selected volume, and/or for one or more account holders. For example, the data may be maintained in a block-level or file-level manner at the storage system 102 and be maintained in an object format at the cloud storage system 124. The storage controller 108 through which the export transits (e.g., as a regular I/O stream according to embodiments of the present disclosure) may manage this conversion to objects. Alternatively, the backup utility 120 may manage/perform the conversion.

This may include, for example, dividing up the volume into a plurality of data extents of the same or different sizes. Each data extent may have its own logical block address (LBA) that represents the starting LBA of that particular data extent. These data extents may then be converted into corresponding data objects—each data object may correspond to a different data extent. This conversion may occur at the backup utility 120 at the same time as compression and/or encryption occurs for storage on the bulk export storage device 122. A converted data object also receives a name, for example with a base name corresponding to the LBA of the data extent as well as other identifiers, such as a recovery point identifier and/or volume identifier to name some examples, for example as described in U.S. application Ser. No. 14/521,053 which is incorporated by reference in its entirety.

When a volume export is started, the storage system 102 may remain online (read/write still allowed) so as to reduce the downtime of the storage system 102 caused from the bulk export. Thus, I/O may continue coming in from one or more hosts 104 during the bulk export. To maintain data integrity and consistency between the volume (being exported) on the storage system 102 and the image being exported for storage at the cloud storage system 124, the storage system 102 may start tracking I/O from one or more hosts 104 once export begins. Subsequent backups to the cloud storage system 124 may be incremental backups, or backups of only data that has changed since a previous time (here, the first, bulk export backup). Thus, the incremental backups may be performed via a network 130 by which the storage system 102 is coupled to the cloud storage system 124. In an embodiment, the network 130 may be the network 112 as mentioned above, while in another embodiment the networks 130 and 112 may be different networks.

One example approach for tracking I/O during a bulk volume export is provided in FIG. 2. FIG. 2 illustrates the status of data extents for a given volume, V0 in this example, at different times with respect to what is to be backed up to the object storage system 124 according to aspects of the present disclosure.

Table 202 in FIG. 2 illustrates the tracked I/O to a given volume V0 in the storage system 102 (one volume being illustrated for purposes of simplicity) at different points in time. Illustrated in FIG. 2 are an initial time 204, a first time 206, and an $n^{th}$ time 208. The initial time corresponds to the period of time between when bulk export starts to the bulk export storage device 122 to when the first incremental backup occurs. This occurs after the storage system 102 receives confirmation that the cloud storage system 124 has completed a bulk import process from the bulk export storage device 122. The table 202 may also be referred to as a tracking log, tracking the I/O to the volume V0 while the export/import takes place.

At the initial time 204 while the volume V0 is being exported to the bulk storage device 122, the storage system 102 (by way of at least one storage controller 108) adds an entry to the tracking log during initial time 204 each time that a write (or other modification) comes in for volume V0. The entries may take various forms, for example an entry that identifies the volume and data extent number (e.g., as specified by an LBA) where data has been changed by new I/O (e.g., a write or read/write). This tracking may continue until the first incremental backup occurs, which takes place after bulk export has completed (the cloud storage system 124 provides an import completion status).

For example, the storage controller 108 may continue tracking writes to the volume V0 during the initial time 204 after the cloud storage system 124 provides the import completion status. During this time, a storage controller 108 (the same or the other controller in the storage system 102) may request the import log created by the cloud storage system 124 during the import, as well as the contents of a data object containing the checksums created by the backup utility 120 (e.g., on a per-object basis) during the bulk export. The import log may include a checksum for each object that the cloud storage system 124 imported from the bulk export storage device 122. The storage controller 108 may compare the checksums from the import log with the checksums from the data object. This may be done, for example, to identify any data objects that did not make it to the cloud storage system 124 (for example, due to a media error of the bulk export storage device 122 and/or some import error).

If the storage controller 108 determines that there is a mismatch, then the storage controller 108 may add identifying information to the tracking log in the initial time 204 to identify the data extent(s) that need to be re-sent to the cloud storage system 124 in order to have a complete image of the volume on the cloud. Thus, the table 202 tracks I/O to the volume as well as includes data extents that need to be resent to maintain consistency between the volume and the image on the cloud.

After the initial bulk export of the volume V0, subsequent backups at times 206 and 208 may be limited to incremental backups. In other words, the storage system 102 may cause only data extents with changed data (or data that was not successfully transferred to the cloud storage system 124 during the bulk export) to be backed up again at the cloud storage system 124, as identified in the tracking log 202. In an alternative embodiment, the storage controller 108 may track the data extents that have been changed since the most recent backup by sweeping the entire address space of the volume V0 to identify any changed data, for example by comparison to timestamps stored with the changed data and/or other mechanism, for example as available in a file-based system.

As an example, the tracking log 202 may be a combination of two bitmaps. During a first time period the storage controller 108 may record observances of write events in the first bitmap (and, in the initial bulk backup, any data extents that did not have corresponding objects reach the volume bucket at the cloud storage system 124). When the time period ends and it is time for an incremental backup, the storage controller 108 may freeze the first bitmap to facilitate the incremental backup. In conjunction with this, the storage controller 108 may cause the storage system 102 to create a snapshot of the volume V0 so that the data is frozen during incremental backup, thereby avoiding any unknown states. For example, the storage controller 108 may have snapshot functionality built in to perform this action.

During this frozen period and during the new time period, the storage controller 108 may track writes that have been sent to the storage system 102 (for volume V0) in the second bitmap. In this manner, any changes that may occur to any data extents during the frozen period are captured and taken care of at a subsequent time. When the new time period closes, the second bitmap may be frozen to facilitate a new incremental backup, and the storage controller 108 may again revert back to the first bitmap. In this manner, the bitmap used may repeatedly alternate so that tracking may occur uninterrupted even during times that incremental backup occurs. Though described with respect to writes, other actions may additionally or alternatively be monitored which are known to cause changes to data that would need to be captured by a backup event.

Continuing with the example in FIG. 2, once the export is complete and any mismatches identified, the storage system 102 may perform the first incremental backup 205, which may include any tracked writes (more generally I/O) that occurred during the initial time 204 as well as any data extents whose corresponding data objects did not complete import at the cloud storage system 124. This may be transmitted over a network, such as network 130, to the cloud storage system 124. A new tracking period referred to as first time 206 may commence at the conclusion of the initial time 204 (e.g., right after the initial time 204 when the first incremental backup 205 begins), during which writes are tracked. In this example, the data extents V0, DSS, V0, DS14-V0, DS16, and V0, DS20 have changed during and/or since the first incremental backup 205 by the time the first time 206 ends. Thus, at the second incremental backup 207, only those changed data extents are converted to data objects, for example by the storage controller 108, and transmitted (e.g., via network 130) to the cloud storage system 124.

This can be again seen with respect to $n^{th}$ time 208, where it can be seen in the example of FIG. 2 that at time n the data extents V0, DSX and V0, DSY were the only ones to change. Thus, when the $n^{th}$ time 208 ends, the storage controller 108 may convert the data extents whose data has changed into respective updated data objects (which may include compression, encryption, and/or checksum as well or for the first time) for an $n^{th}$ incremental backup.

Figure 3:
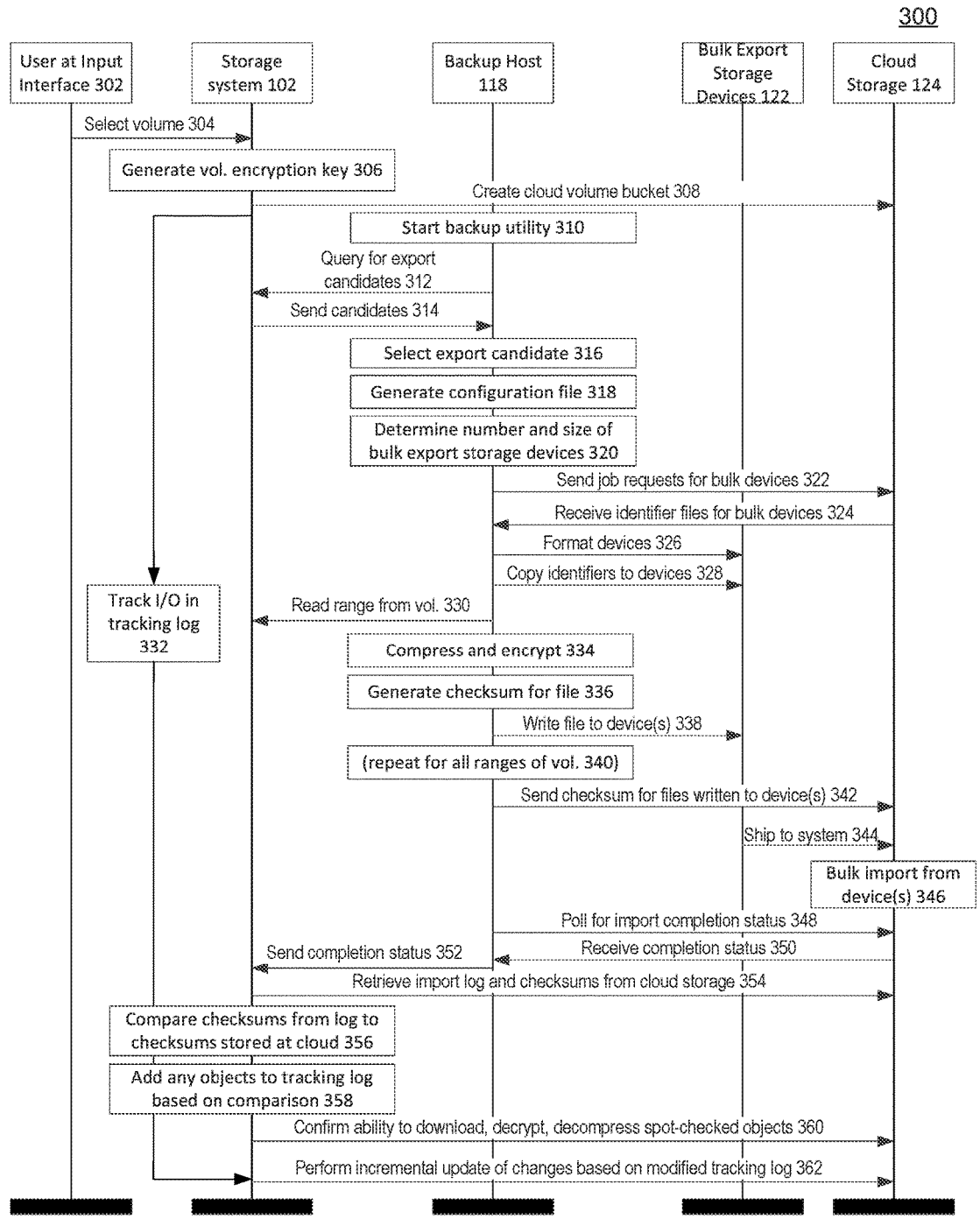
FIG. 3 illustrates a protocol diagram of exemplary signaling aspects between a user, storage system, backup host, bulk export storage device, and cloud storage system according to aspects of the present disclosure.

Turning now to FIG. 3, a protocol diagram 300 is illustrated of exemplary signaling aspects between a user 302, storage system 102, backup host 118, bulk export storage device 122, and cloud storage system 124 according to aspects of the present disclosure.

At action 304, a volume is selected for backup (sometimes referred to as vaulting, and can be added to a vault group). This may include, for example, an identification of the selected volume in a list that identifies volumes pending cloud backup. This selection may be performed, for example, by a command line interface or graphical user interface by a user, for example at a host 104 and/or the backup host 118. The storage system 102 may then wait for further action for this vaulting until a query is received from a backup host.

At action 306, the storage system 102 (e.g., by storage controller 108) generates an encryption key (where encryption is requested) for the selected volume from action 304. This is done as part of adding the selected volume to the list.

At action 308, the storage system 102 (by storage controller 108) creates a cloud volume bucket, illustrated in FIG. 1 as volume bucket 126, in the cloud storage system 124 to be used to hold the selected volume's data.

At action 310, the backup utility 120 at the backup host 118 starts, for example by the instruction of a user (such as the same user at the host 104/backup host 118).

At action 312, the backup utility 120 queries the storage system 102 for volumes specified at the storage system 102 for vaulting to the cloud storage system 124, such as the vault group.

At action 314, the storage controller 108 returns information identifying the volume vaulting candidates. For a volume identified in the vault group, the storage controller 108 of the storage system 102 may return one or more of the following elements of information: a world wide name (WWN) of the identified volume for vaulting, a bucket name for the volume bucket 126 on the cloud storage system 124, an encryption key (or multiple) for the volume on the cloud, a capacity of the volume being vaulted, a block size for the volume, a chunk size for the volume (e.g., specified in blocks), a maximum number of chunks per data object for the vaulting, a protection information mode (e.g., a T10 protection information mode), a public key for the account at the cloud storage system 124, and a secret key for the account at the cloud storage system 124.

At action 316, a volume is selected at the backup host 118 as the export candidate for export in preparation for backing up to the cloud storage system 124. For example, a user of the backup utility 120 may select the export candidate. In another embodiment, the backup utility 120 may automatically select the candidate (where there are multiple listed), based on different metrics such as comparisons of volume sizes (the larger volume being selected), age of the candidates in the list, etc.

At action 318, in response to the selection at action 316, the backup utility 120 generates a configuration file that is used as an export configuration file. This may be generated in an easily consumed format, such as XML or JSON to name some examples. The configuration file may also be encrypted (so as to protect the keys identified per action 314), such as with a user-specified passphrase or a password associated with the storage system 102 to name some examples.

At action 320, the backup utility 120 determines a number of bulk export storage devices 122 to be used for the export of the selected volume, as well as a size for each of the storage devices 122. This may be based on the information in the configuration file(s) as well as the size of the volume (e.g., the volume may be too large for a single storage device size and thus span multiple storage devices 122). In an embodiment, the compression ratio for the data on the volume may be unknown prior to export; thus, the backup utility 120 may prompt for a range of bulk export storage devices 122 depending upon compression ratios.

At action 322, the backup utility 120 sends a job request to the cloud storage system 124 for each of the bulk export storage devices 122 that may be used in the export process. The job request may include information such as account credentials (for the volume bucket 126), bucket name, reply email, etc. that the cloud storage system 124 will use to complete the bulk import. The job request may further include metadata values that the cloud storage system 124 expects to see, such as an encryption scheme, a compression algorithm, etc. A separate job request may be sent for each bulk export storage device 122 identified from action 320; alternatively, multiple may be identified in a single job request transmission.

At action 324, the backup host 118 receives identifier files for each of the bulk export storage devices 122 identified by the job requests sent at action 322. These identifier files are a form of signature files that identify the particular job (export/import job) that the bulk export storage devices 122 are associated with (e.g., account and volume bucket identification) when they arrive at the cloud storage system 124. In an embodiment, the identifier files may be electronic tags that are stored on the bulk export storage devices 122. In embodiments where a range of bulk export storage devices 122 are identified at action 320, the backup host 118 may subsequently send additional job requests to the cloud storage system 124 should more bulk export storage devices 122 be included than previously predicted as the export is occurring.

At action 326, the backup utility 120 formats the bulk export storage devices 122 that will be used for this bulk export (identified at action 320) into a format that is compatible with (or approved by) the cloud storage system 124 (e.g., NTFS, ext4, fat32, etc.).

At action 328, the backup utility 120 places the received identifier files into the corresponding bulk export storage devices 122, for example into a root directory of each bulk export storage device 122.

Actions 322 through 328 may occur in a batch, for example where the number of bulk export storage devices 122 are all attached to the backup host 118 at the same time. Alternatively, actions 322 through 328 may occur serially as bulk export storage devices 122 are individually (or in some subset) attached and detached from the backup host 118. For example, actions 322 through 338 (through writing to the device) may occur to a first bulk export storage device 122, and then loop back from action 338 to action 322 each time a bulk export storage device 122 is filled and a new bulk export storage device 122 is attached to the backup host 118.

At action 330, the backup utility 120 causes the backup host 118 (via another host 104 or itself where it is also a host 104) to start reading the selected volume from the storage system 102. This may be done as a sequential stream of blocks, such as is determined by the specified chunk size*a maximum chunks per object amount (which may, in some embodiments, correspond to the data extent size). This act of reading data from the storage system 102 is performed via I/O channels (e.g., standard/regular read/write paths) of the storage system 102. In an alternative embodiment, the storage controller 108 may push the data from the selected volume to the backup host 118 for writing into the bulk export storage devices 122 (with, e.g., conversion to data objects occurring either at the storage controller 108 or the backup host 118). For simplicity of discussion, the following will refer to where the data is read by the backup host 118.

At action 332, the storage controller 108 begins a tracking log for the selected volume. This tracking log will identify any writes/changes to any range on the selected volume while the export is underway. This will later be used to make sure all changes are eventually sent to the cloud storage system 124 to ensure a self-consistent image of the selected volume in the cloud storage system 124. In this manner, the storage system 102 may remain online during the export process so that the impact on performance of the system is minimized. Although illustrated as occurring at approximately the same time as action 308 (where the volume bucket 126 is created) of FIG. 3, the tracking log may alternatively start at another time, for example at approximately the same time as action 304 or later.

At action 334, the backup utility 120 compresses and/or encrypts the data block read from the selected volume. Compression may be performed by a variety of algorithms, such as the LZ4 algorithm to name an example. Encryption may be performed by a variety of algorithms, such as the AES-256 algorithm using the encryption key generated at action 306 and an initialization vector.

At action 336, the backup utility 120 generates a checksum for the data block that is now in the form of a data object. This may be generated by a variety of algorithms, such as the MD5 algorithm to name an example. For example, the backup utility 120 may use the same checksum algorithm that is used by the cloud storage system 124 at import so that they may be properly compared against each other with minimal processing burden.

At action 338, the backup utility 120 writes the converted data object (e.g., as compressed and encrypted from action 334) to the current bulk export storage device 122.

As identified by action 340, the actions 330-338 repeat for all of the data blocks in the selected volume, all while the storage controller 108 tracks write I/O to the selected volume.

At action 342, the backup utility 120 sends the checksums for the data objects copied to the bulk export storage device(s) 122 used for the export to the cloud storage system 124. The cloud storage system 124 stores these checksums as a data object (one or more) in the volume bucket 126 set aside for the selected volume. This data may be sent via the network 130 separate from the data on the bulk export storage devices 122, or alternatively may be stored in one of the bulk export storage devices 122 (e.g., the last one) for shipping with the devices.

At action 344, the bulk export storage devices 122 are shipped to a physical location of the cloud storage system 124 for subsequent import to the cloud storage system 124.

Bulk import at the cloud storage system 124 occurs at action 346. This may include the cloud storage system 124 importing the data objects and, as part of the import, creating and adding to an import log. The cloud storage system 124 may compute a checksum for each data object that it reads from the bulk storage devices 122 that it received as part of the job for the selected volume. The import log may include, among other things, the checksum calculated for each data object upon import.

At action 348, the backup utility 120 polls the cloud storage system 124 to learn the completion status of the bulk import at the cloud storage system 124.

At action 350, the backup utility 120 receives a completion status in response to the poll from the cloud storage system 124. If the completion status indicates that bulk import is not done yet, then the backup utility 120 may repeat the polling at action 348 (e.g., at intervals) until the status indicates that the bulk import is complete at the cloud storage system 124.

At action 352, upon learning that bulk import is complete at the cloud storage system 124, the backup utility 120 issues a completed export status to the storage system 102.

In response to this completion notification from the backup utility 120, at action 354 the storage controller 108 requests the import log from the cloud storage system 124 for the selected volume, as well as the checksum data object stored with the other data at the volume bucket 126 (generated at export by the backup utility 120). The retrieval may be in one piece, or may be separated into multiple pieces for transmission so that too-large files do not have to be buffered. In an embodiment, the checksums may be maintained in separate files, such as a .cvs file.

At action 356, the storage controller 108 compares these checksums against each other. As an example, the checksum generated for a given data object by the backup utility 120 during export is compared against the checksum generated by the cloud storage system 124 during import. This will confirm that the data corresponds. For example, the storage controller 108 may parse the import log to verify that the data objects received an import status indicating successful import. This will identify whether any data objects went missing during the transfer process (e.g., due to bulk export storage device 122 corruption and/or failure). The storage controller 108 may further compare the checksums against each other; this will identify any mismatches for given data objects. Where mismatches occur, the storage controller 108 may determine that an error occurred during the transfer process (e.g., went missing or was corrupted in some way).

In an embodiment, the storage controller 108 may compare the number of missing/corrupted data objects from the transfer process against a threshold to determine whether to just re-send those missing/corrupted data objects in the next incremental backup (by adding an identifier corresponding to those data objects in the tracking log) or to repeat the bulk export process for the whole volume (e.g., due to one or more entire bulk export storage devices 122 having failed).

At action 358, the storage controller 108 adds identifying information to the tracking log for any data objects that did not properly transfer to the cloud storage system 124 as determined from action 356 (e.g., where the number of missing/corrupted data objects are less than the threshold number).

At action 360, the storage controller 108 checks its ability to download, decrypt, and decompress data objects from the volume bucket 126. For example, the storage controller 108 may "spot check" one or more data objects for some number of data objects less than the full number of data objects vaulted to the cloud storage system 124. For example, to facilitate this spot check the backup utility 120 may have included a "key check" data object that includes known data to be backed up to the cloud storage system 124 with the bulk export. The "key check" data object may include, for example, the WWN of the volume on the cloud and some preset string constant—something to ensure that the storage controller 108 may verify the decrypted contents in a known manner. If the storage controller 108 is not able to verify the decrypted contents, then the storage controller 108 may notify the backup utility 120 that the bulk export may need to occur again.

If the decrypted contents are verified, then the protocol continues to action 362, where the storage controller 108 performs an incremental update of the selected volume to the cloud storage system 124. This may be performed based on the contents of the tracking log that was maintained from action 332 (and which may end approximately when the first incremental update occurs, and for example an atomic switch to an alternate tracking log occurs)—only those data extents identified as having changed during the export process (since the storage system 102 remained online during the process to continue receiving I/O requests from one or more hosts 104) may be sent via the network 130 to the cloud storage system 124. As noted above, for this first incremental backup the tracking log may also include identification of one or more data extents that, though they did not change from a write I/O during the process, were added because their corresponding data objects either did not make it to the bulk import at the cloud storage system 124 or were corrupted during the process.

The protocol may then continue with periodic incremental updates as identified by the tracking log that continues to be maintained over time.

Figure 4:
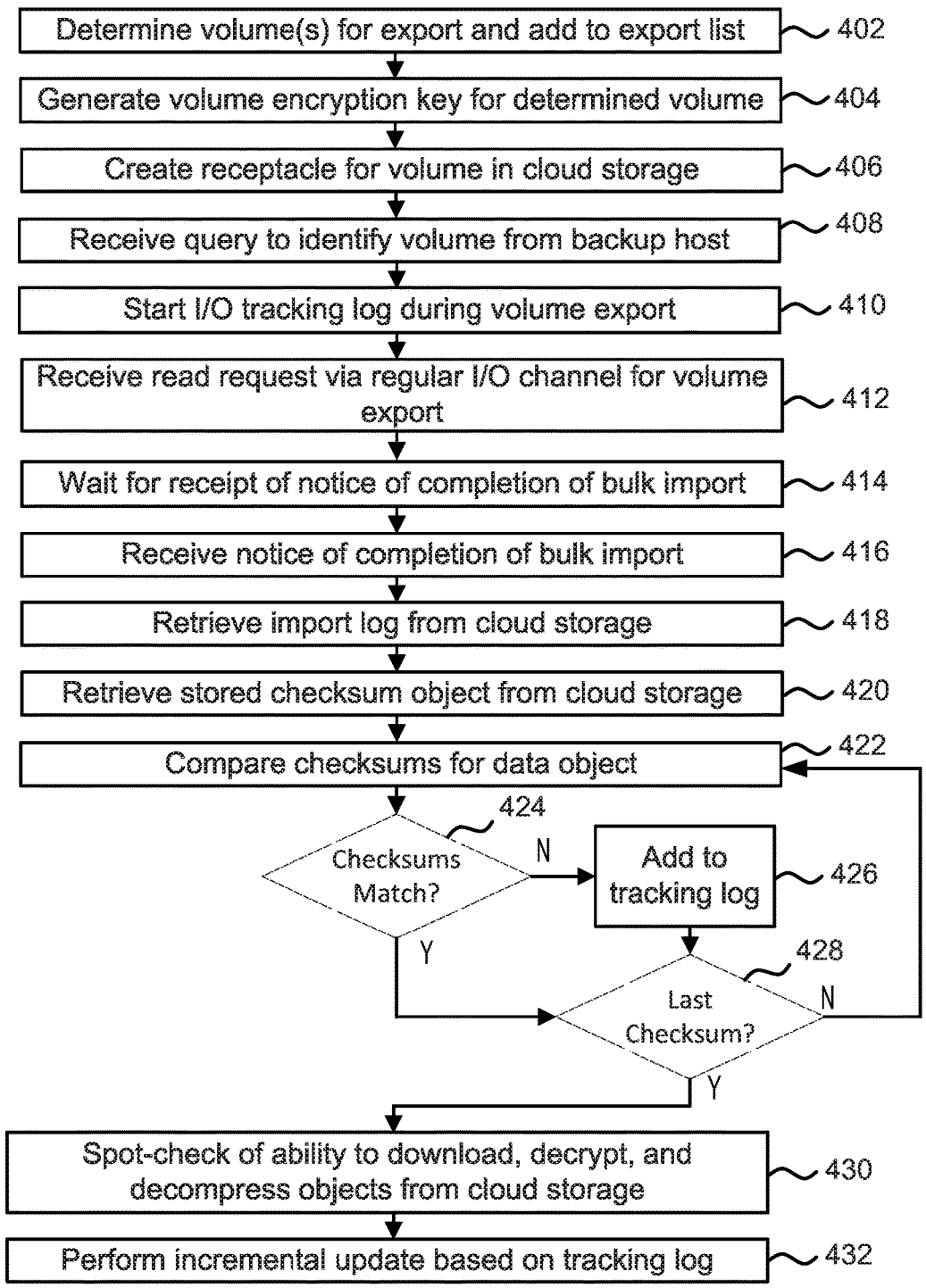
FIG. 4 is a flow diagram of a method for maintaining synchronization by a storage system between the storage system and a cloud storage system during bulk backup according to aspects of the present disclosure.

Turning now to FIG. 4, a flow diagram is illustrated of a method 400 for maintaining synchronization by a storage system 102 between the storage system 102 and a cloud storage system 124 during bulk backup according to aspects of the present disclosure. In an embodiment, the method 400 may be implemented by one or more processors of one or more of the storage controllers 108 of the storage system 102, executing computer-readable instructions to perform the functions described herein. In the description of FIG. 4, reference is made to a storage controller 108 (108.a or 108.b) for simplicity of illustration, and it is understood that other storage controller(s) may be configured to perform the same functions when performing a pertinent requested operation. It is understood that additional steps can be provided before, during, and after the steps of method 400, and that some of the steps described can be replaced or eliminated for other embodiments of the method 400.

At block 402, the storage controller 108 determines a volume or volumes for backup to the cloud storage system 124. This may be selected by a user accessing the storage system 102 via a host 104 and/or backup host 118, for example as discussed with respect to action 304 of FIG. 3 above. For example, selected volumes may be added to a vault group with a bulk export flag being set.

At block 404, the storage controller 108 generates a volume encryption key for the determined volume(s) from block 402 (e.g., where encryption is requested). The volume encryption key may be included with the identification of the selected volume to the list in conjunction with block 402, such as described with respect to action 306 of FIG. 3.

At block 406, the storage controller 108 creates a cloud volume receptacle, also referred to as a cloud volume bucket (126) herein in the cloud storage system 124 for storing the data of the volume selected for bulk export according to embodiments of the present disclosure, such as described with respect to action 308 of FIG. 3.

At block 408, the storage controller 108 receives a query from the backup host 118 (e.g., as directed by the backup utility 120) to identify what volumes have been determined for backing up (such as are listed in a vault group), such as described with respect to action 312 of FIG. 3. In response, the storage controller 108 returns the list to the requesting backup host 118, including additional identifying information, such as described with respect to action 314 of FIG. 3.

At block 410, the storage controller 108 begins tracking I/O to the storage system 102 during the bulk export process so that the storage system 102 may remain online to service I/O requests while the bulk export occurs, such as described with respect to action 332 of FIG. 3. Thus, when any writes come in from one or more hosts 104 that are directed towards the selected volume during the bulk export (as the backup utility 120 continues to read data blocks from the selected volume), the affected data extents are recorded in the tracking log (or otherwise identified) for a subsequent incremental backup (after the bulk export/import is complete). Although identified with block 410, the storage controller 108 may begin tracking I/O at an earlier time, such as at or just after the volumes are determined for export at block 402 as described with respect to FIG. 3, volume encryption keys are generated at block 404, or the volume bucket 126 is created at block 406.

At block 412, the storage controller 108 receives a read request from the backup host 118 (as directed by the backup utility 120) for a selected volume from the list of identified volumes sent to the backup host 118 at block 408. The backup utility 120 may send read requests on a per-block basis, for example with the sizes determined as discussed with respect to action 330 of FIG. 3, and these may be received and fulfilled via a regular I/O channel (e.g., a standard read/write path) of the storage controller 108. The storage controller 108 receives the read requests from the backup host 118 as part of any other I/O from any other hosts 104 during this time (e.g., the storage controller 108 does not discern whether a read request is from a backup host 118 performing a bulk export of a volume or not). Thus, the read requests from the backup host 118 used to obtain the selected volume's data for bulk export may appear to the storage controller 108 as regular host I/O.

At block 414, the storage controller 108 waits for receipt of a notice of completion of bulk import from the cloud storage system 124, e.g. relayed via the backup host 118. During this time, the storage controller 108 may continue to receive I/O requests from one or more hosts, such as hosts 104 and/or backup host 118 while tracking host write I/O (in other words, the storage controller 108 remains online during the bulk export process managed by the backup host 118 to service I/O to any requesting host, including backup host 118).

At block 416, the storage controller 108 receives a notice of completion of bulk import at the cloud storage system 124 from the backup host 118, such as described with respect to action 352 of FIG. 3. This corresponds to the bulk export to the bulk export storage devices 122 completing, the bulk export storage devices 122 being shipped to a physical location of the cloud storage system 124, and import to the volume bucket 126 completing.

At block 418, the storage controller 108 retrieves an import log from the cloud storage system 124 (e.g., via network 130), such as described with respect to action 354 of FIG. 3. The import log includes information identifying the status of the import of the volume to the cloud, such as import status (e.g., OK) and checksums for each data object computed during import by the cloud storage system 124.

At block 420, the storage controller 108 retrieves the checksum data object from the cloud storage system 124 that includes the checksums for the exported data objects calculated by the backup utility 120 of the backup host 118, such as described with respect to action 354 of FIG. 3. This may be done, for example, with a GET request sent via the network 130 from the storage system 102.

At block 422, the storage controller 108 compares the checksums for a given data object as obtained from the import log and the checksum data object, such as described with respect to action 356 of FIG. 3. Before, together with, or after this, the storage controller 108 may also check the import status reported by the cloud storage system 124 from the import.

At decision block 424, the storage controller 108 determines whether the compared checksums match. If they do not, then the method 400 proceeds to block 426. This may correspond to a situation where an error arose in the transfer process (some kind of data corruption was introduced in transfer or by the media of the bulk export storage device 122) or a bulk export storage device 122 failure.

At block 426, in response to determining that some failure occurred (whether corruption or an object going missing), the storage controller 108 adds the data extents corresponding to the affected data objects to the tracking log that is still active, such as described with respect to action 358 of FIG. 3. This is done, even though the data extent(s) have not received a write during this time, so that they may still be included with the first incremental backup to achieve a consistent state between the storage system 102 and the volume bucket 126 on the cloud.

From block 426, the method 400 proceeds to decision block 428. If there are any more checksums to compare, then the method 400 returns to block 422. If there are no more checksums to compare, then the method 400 proceeds to block 430.

Returning to decision block 424, if the storage controller 108 determines that the checksums do match (and the import status was OK, where applicable), then the method 400 proceeds to decision block 428 as described above.

At block 430, the storage controller 108 spot checks one or more data objects (e.g., a key check data object and/or other data objects) of the selected volume that are not stored in the volume bucket 126 on the cloud, such as described with respect to action 360 of FIG. 3. If the spot check fails (e.g., objects cannot properly be decompressed and/or decrypted), then the bulk export process may be restarted for the same selected volume and to go through the blocks and actions described above.

If the spot check result is positive (decompression and/or decryption is successful), then the method 400 proceeds to block 432. At block 432, the storage controller 108 performs the incremental update based on the data extents identified in the tracking log, such as described with respect to action 362 of FIG. 3. Subsequent tracking logs may be kept for subsequent time periods, with periodic incremental updates, as described with respect to FIG. 2 above for example.

Figure 5:
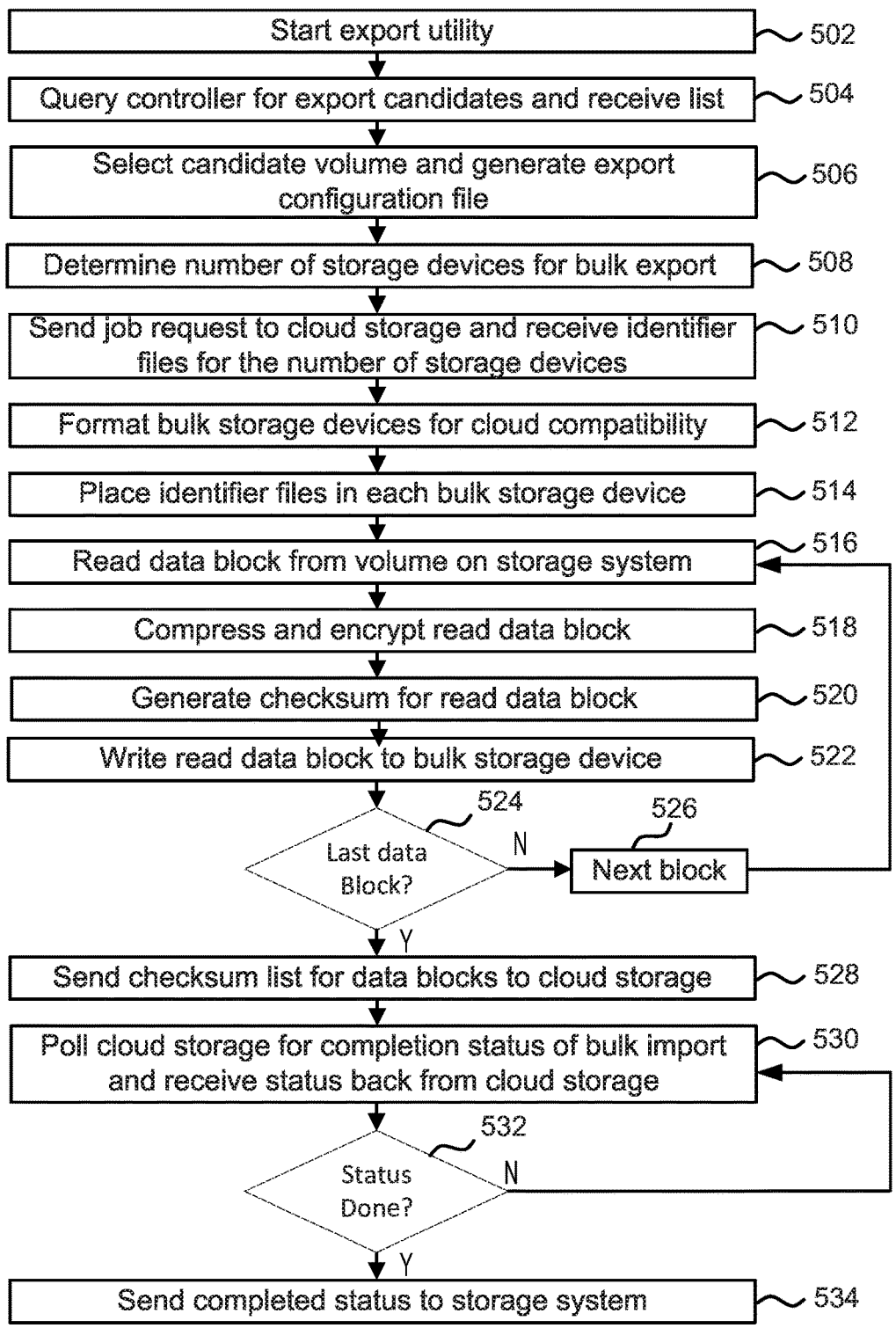
FIG. 5 is a flow diagram of a method for maintaining synchronization by a backup host between a storage system and a cloud storage system during bulk backup according to aspects of the present disclosure.

Turning now to FIG. 5, a flow diagram is illustrated of a method 500 for maintaining synchronization by a backup host 118 between a storage system 102 and a cloud storage system 124 during bulk backup according to aspects of the present disclosure. In an embodiment, the method 500 may be implemented by one or more processors of the backup host 118, executing computer-readable instructions associated with the backup utility 120 to perform the functions described herein. In the description of FIG. 5, reference is made generally to the backup host 118 for simplicity of illustration. It is understood that additional steps can be provided before, during, and after the steps of method 500, and that some of the steps described can be replaced or eliminated for other embodiments of the method 500.

At block 502, the backup (export) utility 120 starts on the backup host 118, such as described with respect to action 310 of FIG. 3.

At block 504, the backup host 118 queries the storage system 102 to identify what volume(s) has been identified as candidates for bulk export according to embodiments of the present disclosure, such as described with respect to action 312 of FIG. 3. In return, the backup host 118 receives a list identifying one or more volumes that are candidates for bulk export, such as described with respect to action 314 of FIG. 3.

At block 506, the backup host 118 selects a volume from the candidate list (e.g., the host 118 itself or a user of the backup host 118), such as described with respect to action 316 of FIG. 3. After selecting a volume, the backup host 118 generates an export configuration file, such as described with respect to action 318 of FIG. 3.

At block 508, the backup host 118 determines the number bulk export storage devices 122 that may be used for the bulk export of the selected volume, such as described with respect to action 320 of FIG. 3. For example, due to possible variability of compression ratios, the determination may be an estimated range of bulk export storage devices 122.

At block 510, the backup host 118 sends a job request corresponding to every determined (e.g., estimated) bulk export storage device 122 to the cloud storage system 124, such as described with respect to action 322 of FIG. 3. In return, the backup host 118 receives identifier files from the cloud storage system 124, e.g. a different identifier file corresponding to each different determined bulk export storage device 122, such as described with respect to action 324 of FIG. 3.

At block 512, the backup host 118 formats the bulk export storage devices 122 into a format compatible with the cloud storage system 124, such as described with respect to action 326 of FIG. 3. Formatting may occur for most of all of the bulk export storage devices 122 in a batch, for example where the number of bulk export storage devices 122 are all attached to the backup host 118 at the same time. Alternatively, formatting may occur as part of a loop between blocks 512 and 524 serially as bulk export storage devices 122 are individually (or in some subset) attached and detached from the backup host 118 as they fill with transferred volume data.

At block 514, the backup host 118 places the identifier files into the corresponding bulk export storage devices 122, such as in a root directed of the corresponding bulk export storage device 122, such as described with respect to action 328 of FIG. 3.

At block 516, the backup host 118 issues a read command to the storage system 102 for a block of data of the selected volume, such as described with respect to action 330 of FIG. 3.

At block 518, the backup host 118 compresses and encrypts the data block (which may be, e.g., the data extent that may be a convenient size for backup) read from the selected volume, such as described with respect to action 334 of FIG. 3.

At block 520, the backup host 118 generates a checksum for the read data block, now a corresponding data object compatible for storage on the cloud storage system 124, such as described with respect to action 336 of FIG. 3.

At block 522, the backup host 118 writes the data object corresponding to the read data block to the bulk storage device 122, such as described with respect to action 338 of FIG. 3.

At decision block 524, if the last data block has not been read yet from the selected volume (meaning the end of the selected volume has not been reached yet), then the method 500 proceeds to block 526, where the backup host 118 prepares to read the next data block from the storage system 102. The method 500 then proceeds back to block 516 and proceeds as discussed above.

If it is determined at decision block 524 that the last data block has been read for the selected volume, then the method 500 instead proceeds to block 528. At block 528, the backup host 118 sends the checksums determined for the data objects of the selected volume to the volume bucket 126 for storage with the rest of the data objects for the selected volume, as described with respect to action 342 of FIG. 3. This may be sent with the bulk storage devices 122 via shipping to a facility of the cloud storage system 124, or alternatively may be sent via the network 130.

At block 530, the backup host 118 polls the cloud storage system 124 to receive a completion status from the cloud storage system 124 with respect to bulk import of the data objects for the selected volume from the bulk export storage devices 122, such as described with respect to action 348. The backup host 118 then receives a status from the cloud storage system 124 in response to the poll, such as described with respect to action 350 of FIG. 3.

At decision block 532, the backup host 118 determines whether the completion status from the cloud storage system 124 indicates that the import process has completed or not. If the status indicates that the import process is not complete, then the method 500 returns to block 530 to poll again (e.g., at intervals). If the status indicates that the import process is complete, then the method 500 proceeds to block 534.

At block 534, the backup host 118 sends a completed status to the storage system 102, for example as described with respect to action 352 of FIG. 3.

Figure 6:
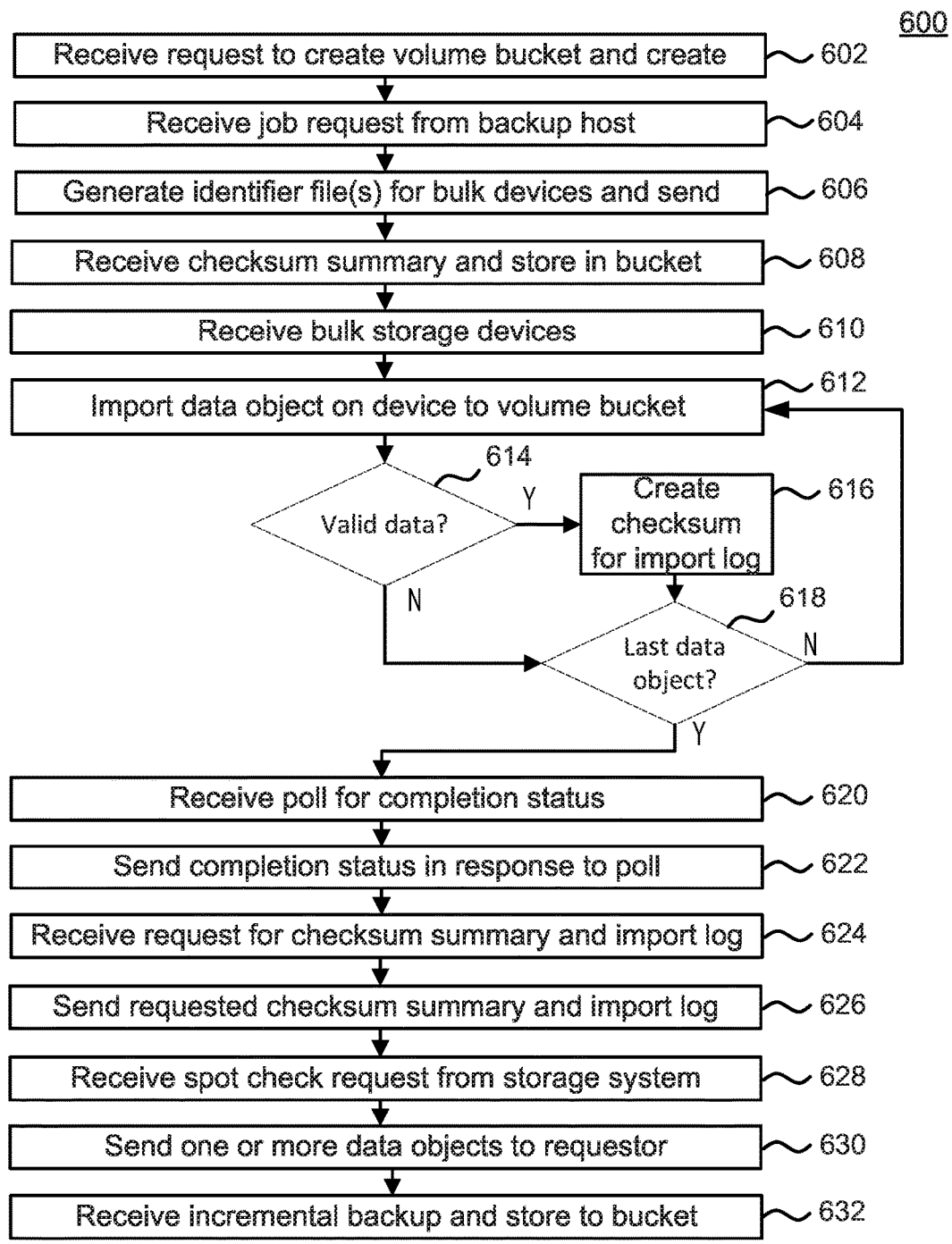
FIG. 6 is a flow diagram of a method for maintaining synchronization by a cloud storage system between a storage system and the cloud storage system during bulk backup according to aspects of the present disclosure.

Turning now to FIG. 6, a flow diagram is illustrated of a method 600 for maintaining synchronization by a cloud storage system 124 between a storage system 102 and the cloud storage system 124 according to aspects of the present disclosure. In an embodiment, the method 600 may be implemented by one or more processors of the cloud storage system 124 to perform the functions described herein. In the description of FIG. 6, reference is made generally to the cloud storage system 124 for simplicity of illustration. It is understood that additional steps can be provided before, during, and after the steps of method 600, and that some of the steps described can be replaced or eliminated for other embodiments of the method 600.

At block 602, the cloud storage system 124 receives a request to create a volume bucket 126 for the storage system 102, such as described with respect to action 308 of FIG. 3, e.g. corresponding to an account already existing or newly created for the owner of the storage system 102.

At block 604, the cloud storage system 124 receives a job request from a backup host 118, such as described with respect to action 322.

At block 606, the cloud storage system 124 generates a number of identifier files corresponding to the number of bulk export storage devices 122 identified in the job request from block 604. The identifier files are then sent to the requesting backup host 118, such as described with respect to action 324 of FIG. 3.

At block 608, the cloud storage system 124 receives a checksum summary data object from the backup host 118, such as described with respect to action 342 of FIG. 3. The checksums in the summary data object correspond to the data objects from the selected volume that were written to the number of bulk export storage devices 122 by the backup host 118.

At block 610, the cloud storage system 124 receives a shipment including the bulk export storage devices 122, such as described with respect to action 344 of FIG. 3. Blocks 308 and 310 may be interchangeable, for example the shipment may be received before the checksum summary data object, or at the same time (whether via different channel such as network 130 or on one or more of the bulk export storage devices 122).

At block 612, the cloud storage system 124 imports a data object from the bulk export storage devices 122 and stores it to the volume bucket 126, such as described with respect to action 346 of FIG. 3.

At decision block 614, the cloud storage system 124 determines whether the data object being imported contains valid data or not (e.g., whether there is any data for the range on the storage device for the given data object such as to catch if no data shipped or if there was a medium error on a bulk export storage device 122). If valid, then the method 600 proceeds to block 616.

At block 616, the cloud storage system 124 creates a checksum for the data object and stores it, with other information, into an import data log that the cloud storage system 124 maintains, such as described with respect to action 346 of FIG. 3.

At decision block 618, the cloud storage system 124 determines whether there are more data objects to import from the bulk export storage devices 122. If so, then the method 600 returns to block 612 and proceeds as described. If not, then the method 600 proceeds to block 620.

Returning to decision block 614, if the data object is determined to be invalid, then the method 600 may instead proceed to decision block 618 and proceed as described above. As part of this, the cloud storage system 124 may include an entry in the import log identifying the invalid nature of the data object, such as with a relevant import status and/or invalid checksum.

At block 620, the cloud storage system 124 receives a poll from the backup host 118 requesting a completion status of the bulk import, such as described with respect to action 348 of FIG. 3.

At block 622, the cloud storage system 124 sends a completion status to the backup host 118 in response to the poll received at block 620, such as described with respect to action 350 of FIG. 3. If the import is not done, then the status indicates such. In such situations, the method 600 may return to block 620 to repeat blocks 620 and 622 until the import is complete. If the import is done, then the status indicates the completion.

At block 624, the cloud storage system 124 receives a request for the checksum summary data object and for the import log (e.g., all in one request or in separate requests) from the storage system 102 that owns the selected volume, such as described with respect to action 354 of FIG. 3.

At block 626, the cloud storage system 124 pulls the requested checksum summary data object from the volume bucket 126 and sends that and the import log (e.g., all in one transmission or in multiple) to the requesting storage system 102, such as described with respect to action 354 as well.

At block 628, the cloud storage system 124 receives a spot check request from the storage system 102, such as described with respect to action 360 of FIG. 3. This request may be for selected data objects (e.g., randomly selected by the storage system 102) or for particular data objects, such as a key check data object.

At block 630, the cloud storage system 124 sends the requested data objects to the storage system 102 so that the storage system 102 may perform a spot check (e.g., for ability to download, decrypt, and/or decompress data objects vaulted to the cloud), such as described with respect to action 360.

At block 632, the cloud storage system 124 receives an incremental update from the storage system 102, such as described with respect to action 362 of FIG. 3. The incremental update may be based on data changes (and/or data export/import failures during the bulk export/import process) identified in a tracking log kept by the storage system 102 during the process.

As a result of the elements discussed above, embodiments of the present disclosure improve upon storage system technology. For example, embodiments of the present disclosure enable the storage system 102 to remain online to service I/O requests while the bulk export occurs. Further, the functioning of the storage system 102 is improved itself as less processing burden is imposed on the storage controller 108 by the backup host 118 handling the compression, encryption, and checksum operations for volume data being exported. As a result, the storage system 102 is able to better service incoming I/O during the export process (e.g., with less lag in response than were the storage system 102 to handle compression, encryption, etc.). Further, embodiments of the present disclosure provide the ability to handle errors in the bulk export process so that any errors may be detected (e.g., by the checksum comparison) so that such errors do not precipitate starting the whole bulk export process again.

In some embodiments, the computing system is programmable and is programmed to execute processes including the processes of methods 400, 500, and/or 600 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    entering, by a storage controller, tracked input/output (I/O) into a tracking log while a volume maintained by the storage controller is exported as a first set of objects to a bulk export storage device for transport to a cloud storage system, wherein the first set of objects corresponds to a first set of checksums determined during export of the volume;
    requesting, by the storage controller, an object comprising the first set of checksums from the cloud storage system based on the cloud storage system providing an import complete status in response to a completion status query;
    receiving, by the storage controller, the object comprising the first set of checksums in response to the request;
    receiving, by the storage controller, a second set of checksums corresponding to a second set of objects from the cloud storage system, the second set of checksums being determined during import of the volume at the cloud storage service from the bulk export storage device;
    comparing, by the storage controller, the received second set of checksums to the first set of checksums from the received object; and
    adding, by the storage controller, identification of a subset of data from the volume to the tracking log, the subset of data corresponding to an object, from the volume, determined to have a checksum present in the first set of checksums but missing from the second set of checksums based on the comparison.

2. The method of claim 1, wherein the exporting further comprises:
    exporting, by the storage controller, the volume via an I/O channel of the storage controller.

3. The method of claim 2, further comprising:
    selecting, by the storage controller, the volume for the export to the bulk export storage device;
    sending, by the storage controller, metadata describing the selected volume in response to a query from a backup host to identify the selected volume; and
    sending, by the storage controller via the I/O channel, a first set of data extents, corresponding to the first set of objects, from the selected volume to the backup host for the export to the bulk export storage device,
    wherein the backup host performs encryption and/or compression to the first set of objects for storage in the bulk export storage device.

4. The method of claim 3, wherein the backup host determines the first set of checksums in response to the storage controller sending the first set of data extents to the backup host.

5. The method of claim 1, further comprising:
    performing, by the storage controller, an incremental synchronization to the cloud storage system that includes the tracked I/O and the identification of the subset of data based on the comparison.

6. The method of claim 1, wherein the first and second sets of checksums are created using a same hashing algorithm.

7. A non-transitory machine readable medium having stored thereon instructions for performing a method comprising machine executable code which when executed by at least one machine, causes the machine to:
    enter tracked input/output (I/O) to the machine into a tracking log while a volume maintained by the machine is exported as a first set of objects to a bulk export storage device for transport to a cloud storage system, wherein the first set of objects corresponds to a first set of checksums determined during export of the volume;
    request an object comprising the first set of checksums from the cloud storage system based on the cloud storage system providing an import complete status in response to a completion status query;
    receive the object comprising the first set of checksums, in response to the request, for comparison to the second set of checksums;
    receive a second set of checksums corresponding to a second set of objects from the cloud storage system, the second set of checksums being determined during import of the volume at the cloud storage service from the bulk export storage device;
    compare the received second set of checksums to the first set of checksums from the received object; and
    add identification of a subset of data from the volume to the tracking log, the subset of data corresponding to an object, from the volume, determined to have a checksum present in the first set of checksums but missing from the second set of checksums based on the comparison.

8. The non-transitory machine readable medium of claim 7, further comprising machine executable code that causes the machine to:
  export the volume via an I/O channel of the machine.

9. The non-transitory machine readable medium of claim 8, further comprising machine executable code that causes the machine to:
  select the volume for the export to the bulk export storage device;
  send metadata describing the selected volume in response to a query from a backup host to identify the selected volume; and
  send, via the I/O channel, a first set of data extents, corresponding to the first set of objects, from the selected volume to the backup host for the export to the bulk export storage device,
  wherein the backup host performs encryption and/or compression to the first set of objects for storage in the bulk export storage device.

10. The non-transitory machine readable medium of claim 9, wherein the backup host determines the first set of checksums in response to the machine sending the first set of data extents to the backup host.

11. The non-transitory machine readable medium of claim 7, further comprising machine executable code that causes the machine to:
  perform an incremental synchronization to the cloud storage system that includes the tracked I/O and the identification of the subset of data based on the comparison.

12. The non-transitory machine readable medium of claim 7, wherein the first and second sets of checksums are created using a same hashing algorithm.

13. A computing device comprising:
  a memory containing machine readable medium comprising machine executable code having stored thereon instructions for performing a method of maintaining data integrity during bulk export;
  a processor coupled to the memory, the processor configured to execute the machine executable code to cause the processor to:
    enter tracked input/output (I/O) into a tracking log while a volume maintained by the computing device is exported as a first set of objects to the bulk export storage device for transport to a cloud storage system, wherein the first set of objects corresponds to a first set of checksums determined during export of the volume;
    request an object comprising the first set of checksums from the cloud storage system based on the cloud storage system providing an import complete status in response to a completion status query;
    receive the object comprising the first set of checksums, in response to the request, for comparison to the second set of checksums;
    receive a second set of checksums corresponding to a second set of objects from the cloud storage system, the second set of checksums being determined during import of the volume at the cloud storage service from the bulk export storage device;
    compare the received second set of checksums to the first set of checksums from the received object; and
    add identification of a subset of data from the volume to the tracking log, the subset of data corresponding to an object, from the volume, determined to have a checksum present in the first set of checksums but missing from the second set of checksums based on the comparison.

14. The computing device of claim 13, the machine executable code further causing the processor to:
  export the volume via an I/O channel of the computing device.

15. The computing device of claim 14, the machine executable code further causing the processor to:
  select the volume for the export to the bulk export storage device;
  send metadata describing the selected volume in response to a query from a backup host to identify the selected volume; and
  send, via the I/O channel, a first set of data extents, corresponding to the first set of objects, from the selected volume to the backup host for the export to the bulk export storage device,
  wherein the backup host performs encryption and/or compression to the first set of objects for storage in the bulk export storage device.

16. The computing device of claim 15, wherein:
  the backup host determines the first set of checksums in response to the computing device sending the first set of data extents to the backup host, and
  the first and second sets of checksums are created using a same hashing algorithm.

17. The computing device of claim 13, the machine executable code further causing the processor to:
  perform an incremental synchronization to the cloud storage system that includes the tracked I/O and the identification of the subset of data based on the comparison.

* * * * *